(12) United States Patent
Chen et al.

(10) Patent No.: US 8,329,837 B2
(45) Date of Patent: Dec. 11, 2012

(54) CELLULOSE-BASED MASTERBATCH WITH NETWORKED STRUCTURE, APPLICATION THEREOF AND METHOD FOR PREPARING THE SAME

(75) Inventors: Su-Chen Chen, Tu-Chen (TW);
Sheng-Jen Lin, Tu-Chen (TW);
Nai-Yun Liang, Taipei (TW);
Chao-Huei Liu, Taipei (TW); Wei-Peng Lin, Sijhih (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 271 days.

(21) Appl. No.: 12/814,677

(22) Filed: Jun. 14, 2010

(65) Prior Publication Data
US 2011/0245447 A1    Oct. 6, 2011

(30) Foreign Application Priority Data

Mar. 30, 2010  (TW) ................................ 99109671 A

(51) Int. Cl.
*C08B 15/10* (2006.01)
(52) U.S. Cl. .................... 526/238.21; 524/284; 524/376; 526/173; 526/208; 526/219.6; 526/258; 526/263; 526/310; 526/312

(58) Field of Classification Search .................. None
See application file for complete search history.

(56) References Cited

U.S. PATENT DOCUMENTS

| 4,007,144 A | * | 2/1977 | Sanders et al. .................. 524/39 |
| 4,454,295 A | * | 6/1984 | Wittmann et al. ............. 527/311 |
| 5,198,477 A | | 3/1993 | von der Haegen et al. |
| 6,020,422 A | | 2/2000 | Connors et al. |
| 2011/0129764 A1 | * | 6/2011 | Xu et al. .......................... 430/2 |

FOREIGN PATENT DOCUMENTS

| EP | 1728899 | 6/2006 |
| GB | 948302 | 1/1964 |

* cited by examiner

*Primary Examiner* — Marc Zimmer
(74) *Attorney, Agent, or Firm* — McClure, Qualey & Rodack, LLP

(57) ABSTRACT

Disclosed herein is a thermoplastic cellulosic composition for preparing a cellulose-based masterbatch and/or a cellulose-based fiber with a networked structure. In one example, the thermoplastic cellulosic composition includes an esterified cellulose present in a range of about 80 wt % to about 95 wt %, polyethylene glycol present in a range of about 4.5 wt % to about 12 wt %, a tri-functional cross-linking agent present in a range of about 0.01 wt % to about 3 wt %, an initiator present in a range of about 0.01 wt % to about 0.15 wt %, and a dispersing agent present in a range of about 0.01 wt % to about 5 wt %.

8 Claims, No Drawings

CELLULOSE-BASED MASTERBATCH WITH NETWORKED STRUCTURE, APPLICATION THEREOF AND METHOD FOR PREPARING THE SAME

RELATED APPLICATIONS

This application claims priority to Taiwan application no. 99109671, filed Mar. 30, 2010, the entirety of which is incorporated herein by reference.

BACKGROUND

1. Field of Invention

The present invention relates to cellulose-based fibers. More particularly, the present invention relates to cellulose-based fibers with a networked structure.

2. Description of Related Art

Cellulose fibers, or cellulosic fibers, are artificial fibers which were developed as early as the end of the $19^{th}$ century. For example, natural celluloses are treated with a complicated process known as "cuprammonium process" to produce the purified (or regenerated) cellulose; alternatively, natural celluloses are chemically modified to yield the esterified celluloses such as cellulose acetate, and then, cellulose fibers are prepared from the resulting celluloses or cellulose derivatives. In the beginning of the $20^{th}$ century, artificial fibers including rayon and acetate fibers have gained their positions in the market.

However, owing to the soaraway progress of the petrochemical technology, the low-cost and easy-to-produce synthetic fibers, such as nylons and polyester fibers, took the place of the artificial fibers as the mainstream products of the textile industry, by the middle of the $20^{th}$ century.

Recently, the depleting reserves and rising prices of petroleum drive the textile industry to seek fibers other than synthetic fibers. Hence, cellulose-based fibers once again attract the research and development attention.

Conventional methods for preparing cellulose-based fibers include wet spinning, dry spinning and melt spinning.

Both wet spinning and dry spinning processes will use organic solvents such as carbon disulfide and dichloromethane. To prevent those organic solvents from damaging the environment, the solvents must be recycled and thereby inevitably increases the complexity and cost of the processes.

Melt spinning process involves in adding a great amount of a low molecular weight plasticizer (molecular weight no greater than 1000 D) in the esterified cellulose to obtain a melt-spinnable composition (masterbatch) which is later melt spun into cellulose-based fibers. Generally, the amount of the plasticizer in the melt-spinnable composition may be 50-90 wt %. However, low-molecular weight plasticizer usually cannot withstand the high spinning temperature, and hence the conventional spinning temperature is controlled under 260° C.; otherwise, the cellulose molecules would become yellowish-brown.

During the melt spinning process, spinning temperature is positively related to the flowability of the molten which, in turn, is positively related to the spinning speed. Therefore, owing to the limitation of the spinning temperature, the spinning speed of the cellulose-based fiber is less than commercially desirable. In addition, large amount of the plasticizer (about 50-90 wt %) often results in the phase separation between the plasticizer and the cellulose, thereby worsening the breaking tenacity of the resultant fiber. The above mentioned disadvantages hinder the melt spun cellulose-based fiber from commercialization.

In view of the foregoing, there exists an urgent need in the related art to provide a novel cellulose-based fiber capable of withstanding a higher spinning temperature and a method for preparing the same.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a thermoplastic cellulosic composition. According to embodiments of the present invention, the amount of the plasticizer of such composition is substantially lower than that of the conventional art, which may facilitate in improving the physical property of the cellulose-based fiber thus-obtained. Moreover, the masterbatch prepared from such composition has a higher activation energy of pyrolysis and hence a better heat-resistance. Accordingly, the masterbatch is suitable for use in a melt spinning process with a higher spinning temperature and spinning speed.

According to embodiments of the present invention, the thermoplastic cellulosic composition comprises an esterified cellulose present in a range of about 80 wt % to about 95 wt %, polyethylene glycol present in a range of about 4.5 wt % to about 12 wt %, a tri-functional cross-linking agent present in a range of about 0.01 wt % to about 3 wt %, an initiator present in a range of about 0.01 wt % to about 0.15 wt %, and a dispersing agent present in a range of about 0.01 wt % to about 5 wt %.

In another aspect, the present invention is directed to a cellulose-based masterbatch with a cellulose-based masterbatch with a networked structure. The cellulose-based masterbatch is prepared from the thermoplastic cellulosic composition according to the aspect and/or embodiment(s) described hereinabove, and is suitable for use in a melt spinning process with a higher spinning temperature and spinning speed.

According to one embodiment of the present invention, the cellulose-based masterbatch comprises about 80 wt % to about 95 wt % of an esterified cellulose, about 4.5 wt % to about 12 wt % of polyethylene glycol, about 0.01 wt % to about 3 wt % of a tri-functional cross-linking agent, about 0.01 wt % to about 0.15 wt % of an initiator and about 0.01 wt % to about 5 wt % of a dispersing agent. Each of the a tri-functional cross-linking agent molecule has three functional groups, and at least part of the a tri-functional cross-linking agent has its three functional groups respectively cross-linked with the molecular chain of the esterified cellulose molecule(s) and the polyethylene glycol molecule(s), thereby forming a networked structure.

According to embodiments of the present invention, the cellulose-based masterbatch is prepared by a method comprising the steps as follows. First, a thermoplastic cellulosic composition according to the aspect/embodiment(s) described hereinabove is prepared. Then, the composition is compounded at a temperature of about 160-220° C. The compounded composition is granulized to form the cellulose-based masterbatch.

In yet another aspect, the present invention is directed to a cellulose-based fiber with a networked structure. The networked structure may improve the polymer rigidity; accordingly, the cellulose-based fiber may exhibit better breaking tenacity.

According to optional embodiments of the present invention, the cellulose-based fiber with a networked structure has a breaking tenacity of about 0.7-1.4 gf/den.

According to various embodiments of the present invention, the cellulose-based fiber with a networked structure is prepared from the masterbatch according to the above-mentioned aspect/embodiment(s) of the present invention, and/or prepared by the method according to the above-mentioned aspect/embodiment(s) of the present invention.

Many of the attendant features will be more readily appreciated as the same becomes better understood by reference to the following detailed description.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

During the melt spinning process, the spinning temperature often depends on the heat-resistance of the masterbatch, whereas the spinning speed depends on the flowability of the molten. As discussed in the background section, the heat-resistance of the conventional cellulose-based masterbatch is less desirable, and hence it is inoperable to increase the spinning temperature of the masterbatch. Since the spinning temperature is positively related to the flowability of the molten, the lower spinning temperature may impose limitations on the spinning speed. Hence, improving the heat resistance of the cellulose-based masterbatch may assist in attaining the commercialization of the cellulose-based fiber.

It is for the above-mentioned purpose, and with that objective in view, in one aspect, the present invention is directed thermoplastic cellulosic compositions and methods for preparing a cellulose-based masterbatch with a networked structure therefrom. Such cellulose-based masterbatch with a networked structure has a higher activation energy of pyrolysis (no less than 180 kJ/mol), thereby improving the heat resistance of the cellulose-based masterbatch during the spinning process. Accordingly, the spinning temperature may be increased, which in turn facilitates improvement in the flowability of the molten, and hence, the spinning speed.

According to embodiments of the present invention, the thermoplastic cellulosic composition comprises an esterified cellulose present in a range of about 80 wt % to about 95 wt %, polyethylene glycol present in a range of about 4.5 wt % to about 12 wt %, a tri-functional cross-linking agent present in a range of about 0.01 wt % to about 3 wt %, an initiator present in a range of about 0.01 wt % to about 0.15 wt %, and a dispersing agent present in a range of about 0.01 wt % to about 5 wt %.

According to embodiments of the present invention, a method for preparing a masterbatch using such thermoplastic cellulosic composition includes the steps as follows. First, a thermoplastic cellulosic composition according to the aspect/embodiment(s) described hereinabove is prepared. Then, the composition is compounded at a temperature of about 160-220° C. The compounded composition is granulized to form the cellulose-based masterbatch with a networked structure.

Specifically, the constituents of the composition are mixed in accordance with the specified weight ratio. Then, the mixed composition is compounded. According to various embodiments of the present invention, the compounding temperature should be carefully controlled in the range of about 160° C. to about 220° C.; preferably, in the range of about 180-200° C. Afterwards, the compounded composition is pelletized to obtain the cellulose-based masterbatch.

As discussed hereinabove, the heat resistance of the polyethylene glycol is not satisfactory. Therefore, compounding the thermoplastic cellulosic composition at a temperature higher than 220° C. may imperil the processability of the resultant masterbatch. For example, the compounding temperature may be about 160, 165, 170, 175, 180, 185, 190, 195, 200, 205, 210, 215 or 200° C.

Generally, the compounding step is carried at a compounding temperature of about 180-220° C.; preferably, at about 180-200° C. For example, the compounding temperature can be about 180, 185, 190, 195, 200, 205, 210, 215 or 200° C.

In some embodiments, the mixing, compounding and pelletizing steps are all carried out in an extruder. Any customary extruders and extrusion techniques for preparing masterbatches may be employed according to the embodiments of the present invention. A well-known compounding apparatus may include, but is not limited to, a single screw extruder, a twin screw extruder, a multi screw extruder, a brabender, and a kneader.

Alternatively, the mixing, compounding and/or pelletizing steps can be carried out in separate equipments. In one example, the mixing step may be done in any suitable container or mixer, and then, the mixed composition is fed into an extruder for the compounding and pelletizing.

According to the principles and spirits of the present invention, the thermoplastic cellulosic composition adopts a tri-functional cross-linking agent. During the compounding step, the three functional groups (such as ally groups) of the tri-functional cross-linking agent may react with the functional groups of the esterified cellulose molecule and/or the polyethylene glycol molecule thereby forming a networked structure having the cross-linked esterified cellulose and polyethylene glycol. Regarding the polymers for use in melt spinning process, such networked structure may be an advantageous property, for it may improve the heat-resistance of the polymer In the conventional art, unsatisfactory problems such as agglomeration of the plasticizer (polyethylene glycol) and phase separation between the polyethylene glycol and the esterified cellulose are commonly seen. The method for preparing a masterbatch according to the present invention may advantageously ameliorate such problems. Generally, in the masterbatch with a networked structure provided herein, part of the plasticizer molecules would connect to the molecular chain(s) of the esterified cellulose molecule(s) via the cross-linking agent. Without being bound to any theory, it is believed that by connecting part of the plasticizer molecules to the esterified cellulose molecule(s), the possibility of the phase separation and agglomeration can be reduced. In addition, lesser amount plasticizer is necessary to achieve the desired thermal processability of the masterbatch, as compared with the conventional art. For example, according to embodiments of the present invention, the amount of the plasticizer in the thermoplastic cellulosic composition may be about 4.5, 5, 5.5, 6, 6.5, 7, 7.5, 8, 8.5, 9, 9.5, 10, 10.5, 11, 11.5 or 12 wt %.

It should be noted that in the masterbatch with a networked structure provided herein, the molecular chains of molecules within the polymer are connected to one another, thereby resulting in a discontinuous phase across the polymer. Accordingly, the mobility of the plasticizer (polyethylene glycol) within the polymer is limited. Therefore, the plasticizer according to embodiments of the present invention may have a lower molecular weight. For example, polyethylene glycol having a molecular weight of about 600-10,000 Da may be used. For the plasticizer having a molecular weight greater than 10,000 Da, the plasticizer may not evenly distribute across the polymer. More specifically, the molecular weight of polyethylene glycol may be about 600, 700, 800, 900, 1,000, 2,000, 3,000, 4,000, 5,000, 6,000, 7,000, 8,000, 9,000 or 10,000 Da.

According to the principles and spirits of the present invention, any suitable esterified cellulose may be used in the composition. Examples of the esterified cellulose include, but are not limited to: cellulose acetate, cellulose acetate propionate (CAP), cellulose acetate butyrate (CAB), cellulose acetate pentanoate, cellulose propionate n-butyrate, cellulose acetate laurate and cellulose acetate stearate. In addition, the composition may comprise a mixture consisting of at least two esterified celluloses.

According to one embodiment of the present invention, the esterified cellulose may be cellulose acetate propionate having an esterification ratio that is no less than about 50%. Cellulose acetate propionate is a cellulose ester wherein the hydroxyl groups of cellulose are substituted with acetyl and propionyl. The term "esterification ratio that is no less than about 50%" means that the acetyl and propionyl groups together substitute at least about 50% of the hydroxyl groups. Esterified cellulose having an esterification ratio no less than about 50% is suitable for use in thermal processing. Preferably, the esterification ratio of the esterified cellulose is at least about 75%; more preferably, at least about 90%. For example, the esterification ratio of the esterified cellulose may be about 50, 55, 60, 65, 70, 75, 80, 85, 90, 95, 98% or higher.

According to the principles and spirits of the present invention, the thermoplastic cellulosic composition may include any cross-linking agent having three functional groups capable of connecting cellulose molecule(s) and/or polyethylene glycol molecule(s). Illustrative examples of bifunctional chain extender include, but are not limited to, triallyl amine, triallyl trimesate (TAM), triallyl cyanurate (TAC), triallyl isocynaurate (TAIC), triallyl-ammoniumcyanurate and triacryloylhexahydro-1,3,5-triazine (TAT). For example, triallyl isocynaurate is used in working examples presented hereinafter.

One problem faced by the conventional cross-linking technique is that the cross-linking level of the resultant masterbatch cannot be controlled in a repeatable way. Hence, during the melt spinning process, the molten of the conventional masterbatch would become very thick such that the spinning process cannot proceed. The novel cross-linking process according to embodiments of the present invention, on the other hand, provides a solution to the above-mentioned problem at least by carefully controlling the amount of the tri-functional cross-linking agent. Specifically, the masterbatch prepared by the compounding method provided herein, would exhibit a stable spinning pressure of about 40-50 bar during the melt spinning process.

According to embodiments of the present invention, the amount of the tri-functional cross-linking agent in the composition may be about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9 or 3 wt %.

The choice of the initiator often depends on the trifunctional cross-linking agent to be used. Illustrative examples of initiators include, but are not limited to, potassium persulfate, azobisisobutyronitrile, potassium peroxide, and benzyl dimethyl ketal (BDK).

Generally, only a small amount of the initiator is operable to initiate the cross-linking reaction. Specifically, the weight percent of the initiator of the thermoplastic cellulosic composition is about 0.01, 0.02, 0.03, 0.04, 0.05, 0.06, 0.07, 0.08, 0.09, 0.1, 0.11, 0.12, 0.13, 0.14 or 0.15 wt %.

The dispersing agent may assist in uniformly distributing the constituents within the thermoplastic cellulosic composition. Generally, the dispersing agent may be $C_{15-38}$ alkanes, $C_{15-38}$ esters, $C_{15-38}$ organic acids, or a mixture thereof. In the working examples presented hereinafter, the composition comprises about 0.01 wt % to about 5 wt % of paraffin as the dispersing agent. Specifically, the weight percent of the dispersing agent of the thermoplastic cellulosic composition is about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9 or 5 wt %.

According to the principles and spirits of the present invention, the amount of the plasticizer used in the composition and/or method presented herein is much lower than that of the conventional art. Also, the problems such as phase separation and agglomeration can be reduced. Accordingly, the physical properties of the masterbatch/cellulose-based fiber can be improved. For example, the cellulose-based fiber according to one embodiment of the present invention is no less than about 1.2 g/den.

In another aspect, the present invention is directed to a cellulose-based masterbatch with a networked structure. The cellulose-based masterbatch is prepared from the thermoplastic cellulosic composition according to the aspect and/or embodiment(s) described hereinabove, and is suitable for use in a melt spinning process using a higher spinning temperature and spinning speed for preparing a cellulose-based fiber with a networked structure.

According to embodiments of the present invention, the cellulose-based masterbatch comprises about 80 wt % to about 95 wt % of an esterified cellulose, about 4.5 wt % to about 12 wt % of polyethylene glycol, about 0.01 wt % to about 3 wt % of a tri-functional cross-linking agent, about 0.01 wt % to about 0.15 wt % of an initiator and about 0.01 wt % to about 5 wt % of a dispersing agent.

In the cellulose-based masterbatch with a networked structure, each of the a tri-functional cross-linking agent molecule has three functional groups, and during the compounding process, at least part of the a tri-functional cross-linking agent has its three functional groups respectively cross-linked with the free radicals of the molecular chain of the esterified cellulose molecule(s) and the polyethylene glycol molecule(s), thereby forming a networked structure.

According to embodiments of the present invention, the cellulose-based masterbatch with a networked structure has an activation energy of pyrolysis higher than that of a conventional cellulose-based masterbatch (i.e., the those without the networked structure). In one working example, the cellulose-based masterbatch with a networked structure has an onset temperature of pyrolysis higher than about 240° C. In another working example, the cellulose-based masterbatch with a networked structure has an activation energy of pyrolysis higher than about 190 kJ/mol.

In yet another aspect, the present invention is directed to a melt spinning process for preparing a cellulose-based fiber with a networked structure. According to the principles and spirits of the present invention, the cellulose-based masterbatch of the above-mentioned aspect/embodiment(s) of the present invention is subjected to a melt spinning process, and thereby forms a cellulose-based fiber with a networked structure.

Specifically, in the melt spinning process, suitable spinning temperature is about 220-280° C., for example, about 220, 225, 230, 235, 240, 245, 250, 255, 260, 265, 270, 275 or 280° C.; whereas suitable spinning speed is about 500-3000 M/min, for example, about 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900 or 3000 M/min.

Generally, a spinning temperature of about 220° C. is sufficient for the spinning process to proceed. However, it is also well known that spinning temperature is positively related to the spinning speed. As described in the background section, the conventional spinning temperature is controlled under 260° C.; otherwise, the cellulose molecules would become yellowish-brown.

However, cellulose-based masterbatch with a networked structure according to embodiments of the present invention have a relatively high activation energy of pyrolysis (greater than 190 kJ/mol) and a relatively high onset temperature of pyrolysis (greater than 240° C.), and hence, the masterbatch is suitable for use in a melt spinning process with a relatively high spinning temperature. The results show that the spinning process may go on even when the spinning temperature is maintained at about 280° C.

Moreover, according to embodiments of the present invention, when the spinning temperature is set at about 230-240° C., the apparent viscosity of the molten is about 22-78 Pas. Generally, during the melt spinning process, if the molten achieved an apparent viscosity greater than 40 Pas, the spinning apparatus may be damaged due to the pressure caused by the molten. To the contrary, if the molten could not achieve an apparent viscosity of at least 20 Pas, the spinning pressure may be too low to proceed with the spinning. However, according to one embodiment of the present invention, since the heat resistance of the cellulose-based masterbatch with a networked structure is better than the conventional ones, it is possible to carry out the spinning process at a spinning temperature higher than 240° C., in which case, the apparent viscosity of the molten would be lowered to about 20-40 Pas.

Also, the apparent viscosity of the cellulose-based masterbatch with a networked structure is higher than that of the conventional cellulose-based masterbatch (apparent viscosity of which at 230° C. is about 16-48 Pas); hence, the flowability of the molten under the spinning condition is better. Accordingly, the cellulose-based masterbatch with a networked structure is suitable for use in a melt spinning process with a relatively high spinning speed. According to embodiments of the present invention, the spinning process may go on at a spinning speed of about 3000 m/min without filament break. By comparison, the maximum spinning speed for preparing the cellulosed-based fiber of the conventional art is 1000 m/min. In view of the foregoing, the cellulose-based masterbatch with a networked structure and the melt spinning process provided herein are suitable for use in mass production of the cellulosed-based fiber. Also, the melt spinning process may enhance the production yield of the cellulose-based fibers.

In still another aspect, the present invention is directed to a cellulose-based fiber with a networked structure. The cellulose-based fiber may be prepared from the masterbatch, by the method and/or the melt spinning process according to aspects/embodiments of the present invention. Since the plasticizer within the cellulose-based fiber may be connected to the molecular chain of the cellulose molecule via the cross-linking agent, the plasticizer can be evenly distributed across the polymer. Also, phase separation between the cellulose molecules and the plasticizer may be reduced. Accordingly, the resultant cellulose-based fiber may exhibit a better mechanical strength. For example, in one working example, the cellulose-based fiber with a networked structure may have a breaking tenacity that is no less than about 1.2 g/den.

According to embodiments of the present invention, constituents of the cellulose-based fiber with a networked structure are similar to those of the cellulose-based masterbatch. That is, the cellulose-based fiber may comprise about 80 wt % to about 95 wt % of an esterified cellulose, about 4.5 wt % to about 12 wt % of polyethylene glycol, about 0.01 wt % to about 3 wt % of a tri-functional cross-linking agent, about 0.01 wt % to about 0.15 wt % of an initiator and about 0.01 wt % to about 5 wt % of a dispersing agent, wherein each of the tri-functional cross-linking agent has three functional groups, and at least part of the tri-functional cross-linking agent has its three functional groups respectively connected to the molecular chain of the esterified cellulose molecule or the polyethylene glycol molecule, thereby forming the networked structure Some working examples according to embodiments of the present invention are provided hereinafter so as to illustrate the properties of the masterbatch and fiber provided herein. In a twin screw extruder, constituents were mixed with the weight ratios specified in Table 1 to obtain thermoplastic cellulosic compositions of various working examples. Then, the thermoplastic cellulosic compositions were compounded in the twin screw extruder at a temperature of about 160-220° C. to allow the tri-functional cross-linking agent to react with the esterified cellulose molecules. After the compounding step, the compounded composition may be granulized to form a plurality cellulose-based masterbatch.

For example, in working example 1, about 92 wt % of cellulose acetate propionate (CAP), about 3.5 wt % of polyethylene glycol (PEG) having a molecular weight of about 600 Da, about 3.5 wt % of PEG having a molecular weight of about 1,000 Da, about 0.5 wt % of triallyl isocynaurate (TAIC), about 0.45 wt % of paraffin and about 0.05 wt % of benzyl dimethyl ketal (BDK) were mixed to obtain the thermoplastic cellulosic composition. The composition were than compounded and granulized to produce the masterbatch of working example 1.

In order to investigate whether or not the resultant masterbatch is suitable for use in the melt spinning process, the masterbatch was subjected to thermogravimetric analysis to determine the onset temperature of the pyrolysis (Onset Temp). In addition, the activation energy of pyrolysis (Activation Energy) of each masterbatch is calculated based on the onset temperature of the pyrolysis. Result of the thermogravimetric analysis is summarized in Table 1.

In addition, cellulose-based fibers were prepared from the masterbatch of the working examples with a melt spinning process, where the spinning temperature is about 240° C. or 250° C., and the spinning speed is about 1000 M/min or 1500 M/min.

The fibers were further tested by a tensile strength tester in accordance with the procedure set forth in ASTM D2256 (Standard Test Method for Tensile Properties of Yarns by the Single-Strand Method) to determine the breaking elongation (Elongation) and breaking tenacity (Tenacity) of the fibers. Results of the analysis are summarized in Table 1.

TABLE 1

|  |  | Working example 1 | Working example 2 | Working example 3 | Working example 4 | Working example 5 | Working example 6 | Working example 7 | Compar. example |
|---|---|---|---|---|---|---|---|---|---|
| CAP (wt %) | | 92 | 91.5 | 91.3 | 88.3 | 86.3 | 86.0 | 85.4 | 87.5 |
| PEG (wt %) | 600 | 0 | 0 | 0 | 0 | 0 | 0 | 6 | |
| | 1000 | 7 | 7 | 10 | 12 | 12 | 12 | 6 | |
| | 8000 | 0 | 0 | 0 | 0 | 0 | 0 | 0 | |
| TAIC (wt %) | | 0.5 | 1.0 | 1.2 | 1.2 | 1.2 | 1.5 | 2.1 | 0 |
| Paraffin (wt %) | | 0.45 | 0.45 | 0.45 | 0.45 | 0.45 | 0.45 | 0.45 | 0.45 |
| BDK (wt %) | | 0.05 | 0.05 | 0.05 | 0.05 | 0.05 | 0.05 | 0.05 | 0.05 |
| Onset Temp. (° C.) | | — | — | 260 | 260 | 260 | — | 280 | 170 |
| Act. energy (kJ/mol) | | — | — | — | — | 189.6 | 193.8 | 258.3 | 177.6 |
| Spinning Temp. (° C.) | | 240 | 240 | 240 | 240 | 250 | — | — | 240 |
| Spinning speed (M/min) | | 1000 | 1000 | 1000 | 1000 | 1000 | — | — | 1500 |
| Apparent viscosity (Pas) | | — | — | — | — | 27-78 | — | — | 16-48 |
| Denier (den) | | 150 | 150 | 153 | 152 | 299.8 | — | — | 150 |
| Tenacity (g/den) | | 1.21 | 1.14 | 0.91 | 1.13 | 0.77 | — | — | 0.72 |
| Elongation (%) | | 20 | 16 | 15 | 18 | 27 | — | — | 17 |

As table 1 shows, the cellulose-based masterbatch with a networked structure according to embodiments of the present invention has an activation energy of pyrolysis higher than that of a conventional, non-cross-linked cellulose-based masterbatch. That is, the cellulose-based masterbatch with a networked structure has a better heat resistance.

Specifically, the cellulose-based masterbatch of the comparative example has an activation energy of pyrolysis of about 177.6 kJ/mol, and an onset temperature of pyrolysis of about 170° C.; in comparison, the cellulose-based masterbatch with a networked structure of working example 5 has an activation energy of pyrolysis of about 189.6 kJ/mol, and an onset temperature of pyrolysis of about 260° C., both of which are substantially higher than that of the masterbatch of the comparative example.

Moreover, by comparing working examples 5-7, it is found that as the amount of the tri-functional cross-linking agent increases, the activation energy of pyrolysis of the resultant masterbatch also increases. During the melt spinning process, if the masterbatch to be used was more resistant to heat, it is possible to increase the spinning temperature, and hence the spinning speed. That is, the masterbatch according to the present invention is suitable for use in commercial mass production. For example, according to one working example of the present invention, the onset temperature of pyrolysis of the cellulose-based masterbatch with a networked structure is about 260-280° C.; and hence, the masterbatch can be used in a spinning process with a spinning temperature of about 240° C.-250° C.

As shown in Table 1, the cellulose-based fibers with a networked structure of the working examples the may have a breaking tenacity (about 0.77-1.21 g/den) better than the tenacity of the conventional cellulose-based fiber (about 0.72 g/den). Regarding the breaking elongation, cellulose-based fibers of working examples 1, 4, and 5 are also better than the conventional one (about 18-27% versus about 17%). In view of the foregoing, the physical properties of the cellulose-based fiber prepared by the spinning method provided herein may comply with the properties required by the textile and weaving industry.

To further investigate the spinnability of the fiber and the physical properties of the resultant fiber using a spinning process with a high spinning temperature and a high spinning speed, cellulose-based masterbatch of the working example 5 were melt-spun under different conditions as illustrated in Table 2. Also, the breaking elongation (Elongation) and breaking tenacity (Tenacity) of the fibers were determined in accordance with the procedure set forth in ASTM D2256. Results of the analysis are summarized in Table 2.

TABLE 2

| | Working example 5-1 | Working example 5-2 | Working example 5-3 | Working example 5-4 | Working example 5-5 | Working example 5-6 | Working example 5-7 | Working example 5-8 |
|---|---|---|---|---|---|---|---|---|
| Spinning Temp. (° C.) | 240 | 250 | 260 | 270 | 280 | 260 | 260 | 260 |
| Spinning speed (m/min) | 800 | 1000 | 1000 | 2000 | 1500 | 2000 | 2500 | 3000 |
| Denier (den) | 336 | 300 | 280 | 193 | 185 | 145 | 115 | 97 |

TABLE 2-continued

|  | Working example 5-1 | Working example 5-2 | Working example 5-3 | Working example 5-4 | Working example 5-5 | Working example 5-6 | Working example 5-7 | Working example 5-8 |
|---|---|---|---|---|---|---|---|---|
| Tenacity (g/den) | 0.75 | 0.77 | 0.9 | 0.76 | 0.79 | 0.84 | 0.9 | 0.83 |
| Elongation (%) | 24 | 27 | 15 | 17 | 18 | 16 | 17 | 12 |

As can be seen in table 2, in working example 5-5, the cellulose-based fiber with a networked structure can be melt-spun at a spinning temperature of about 280° C. Moreover, in working example 5-8, the spinning speed can be set at about 3000 M/min. All the weaving processes listed in table 2 continued for more than half an hour without filament break.

The appearance of the fibers of working example 5-1 to 5-8 are quite similar; that is, different spinning speed as set forth in table 2 would not substantially affect the appearance of the resultant fiber.

In sum, the masterbatch with a networked structure provided herein is suitable for use in a melt spinning process where the spinning temperature is about 220-280° C. and the spinning speed is about 500-3000 m/min. Moreover, the resultant cellulose-based fiber with a networked structure may have a tenacity of about 0.75 g/den to about 1.21 g/den.

Conventional masterbatch of the comparative example is further melt-spun at a spinning temperature of about 260° C., and the CIE value of the resultant fiber is about 8. In comparison, the CIE value of the cellulose-based fiber of the working example 5-8 is about 35. CIE value is a relative value, and a sample having a higher CIE value is whiter in color. It is believed that owing to the more heat-resistant nature of the cellulose-based masterbatch with the networked structure, the present masterbatch, upon being heat under a relatively high spinning temperature (about 260° C.), would not be burned. Hence, the resultant fiber is whiter than the conventional ones.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A cellulose-based masterbatch with a networked structure, comprising:
    an esterified cellulose in a range of about 80 wt % to about 95 wt %;
    polyethylene glycol in a range of about 4.5 wt % to about 12 wt %;
    a tri-functional cross-linking agent in a range of about 0.01 wt % to about 3 wt %;
    an initiator in a range of about 0.01 wt % to about 0.15 wt %; and
    a dispersing agent in a range of about 0.01 wt % to about 5 wt %, wherein each of the tri-functional cross-linking agent has three functional groups, and at least part of the tri-functional cross-linking agent has its three functional groups respectively connected to the molecular chain of the esterified cellulose molecule or the polyethylene glycol molecule, thereby forming the networked structure.

2. The cellulose-based masterbatch of claim 1, wherein the cellulose-based masterbatch is prepared by a method comprising:
    preparing a composition of the esterified cellulose, polyethylene glycol, tri-functional crosslinking agent, initiator and dispersing agent;
    compounding the composition at a temperature of about 160-220° C.; and
    granulizing the compounded composition to form the cellulose-based masterbatch with a networked structure.

3. The cellulose-based masterbatch of claim 1, wherein esterified cellulose is cellulose acetate, cellulose acetate propionate, cellulose acetate butyrate, cellulose acetate pentanoate, cellulose propionate n-butyrate, cellulose acetate laurate, cellulose acetate stearate or mixtures of these.

4. The cellulose-based masterbatch of claim 1, wherein the polyethylene glycol has a molecular weight of about 600-10,000 Da.

5. The cellulose-based masterbatch of claim 1, wherein the tri-functional cross-linking agent is triallyl amine, triallyl trimesate (TAM), triallyl cyanurate (TAC), triallyl isocynaurate (TAIC), triallyl-ammoniumcyanurate or triacryloyl-hexahydro-1,3,5-triazine (TAT).

6. The cellulose-based masterbatch of claim 1, wherein the initiator is potassium persulfate, azobisisobutyronitrile, or benzyl dimethyl ketal.

7. The cellulose-based masterbatch of claim 1, wherein the dispersing agent is selected from a group consisting of $C_{15-38}$ alkanes, $C_{15-38}$ esters, $C_{15-38}$ organic acids, and a mixture thereof.

8. The cellulose-based masterbatch of claim 1, wherein the cellulose-based masterbatch has an onset temperature of pyrolysis no less than about 240° C.

* * * * *